(12) United States Patent
Hozuki et al.

(10) Patent No.: US 11,366,041 B2
(45) Date of Patent: Jun. 21, 2022

(54) ENGINE MISFIRE DETECTION DEVICE (71) Applicant: Mitsubishi Electric Corporation, Tokyo (JP)

(72) Inventors: Takashi Hozuki, Hyogo (JP); Shuichi Wada, Hyogo (JP); Takeshi Koda, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 231 days.

(21) Appl. No.: 16/693,848

(22) Filed: Nov. 25, 2019

(65) Prior Publication Data
US 2020/0319060 A1   Oct. 8, 2020

(30) Foreign Application Priority Data

Apr. 5, 2019 (JP) .............................. JP2019-072407

(51) Int. Cl.
*G01M 15/11* (2006.01)
*F02D 41/22* (2006.01)

(52) U.S. Cl.
CPC ........... *G01M 15/11* (2013.01); *F02D 41/221* (2013.01); *F02D 2200/1015* (2013.01)

(58) Field of Classification Search
CPC .................. G01M 15/11; F02D 41/221; F02D 2200/1015
USPC ...................................................... 73/114.04
See application file for complete search history.

(56) References Cited

U.S. PATENT DOCUMENTS

| 5,311,773 A * | 5/1994 | Bradshaw | G01M 15/11 |
| | | | 73/114.04 |
| 5,592,388 A * | 1/1997 | Bradshaw | G01M 15/11 |
| | | | 123/436 |
| 5,639,960 A | 6/1997 | Nakagawa | |
| 5,808,186 A * | 9/1998 | Matsumoto | F02D 41/222 |
| | | | 73/114.03 |
| 2004/0211249 A1* | 10/2004 | Kiyomura | G01M 15/11 |
| | | | 73/114.07 |

(Continued)

FOREIGN PATENT DOCUMENTS

JP       05-332193 A    12/1993
JP       09-287516 A    11/1997

OTHER PUBLICATIONS

Japanese Office Action dated Jun. 30, 2020 in Patent Application No. 2019-072407.

*Primary Examiner* — Logan M Kraft
*Assistant Examiner* — John D Bailey
(74) *Attorney, Agent, or Firm* — Richard C. Turner (57) ABSTRACT

An engine misfire detection device such that an engine misfire state can be accurately detected is obtained. The engine misfire detection device includes an engine rotational speed change amount detector that detects an engine rotational speed change amount, an engine rotational speed change amount threshold setter that sets a threshold with respect to the rotational speed change amount, and a misfire detector that compares the rotational speed change amount and the threshold, carries out a misfire determination on the engine when the rotational speed change amount exceeds the threshold, and carries out a misfire detection, wherein the misfire detector prohibits the misfire determination when a switching between a differentially locked state and an unlocked state is carried out.

7 Claims, 7 Drawing Sheets (56) References Cited

U.S. PATENT DOCUMENTS

| | | | |
|---|---|---|---|
| 2004/0237635 A1* | 12/2004 | Ohsaki | F02D 41/22 |
| | | | 73/114.07 |
| 2009/0063024 A1* | 3/2009 | Katayama | G01M 15/11 |
| | | | 73/114.02 |
| 2010/0031736 A1* | 2/2010 | Kushihama | G01M 15/11 |
| | | | 73/114.04 |
| 2017/0001510 A1* | 1/2017 | Itagaki | F16D 41/125 |
| 2018/0211454 A1* | 7/2018 | Carlson | B60W 50/0205 |
| 2019/0217852 A1* | 7/2019 | Komoda | B60W 20/15 |

* cited by examiner

FIG. 7

ENGINE MISFIRE DETECTION DEVICE

BACKGROUND OF THE INVENTION

Field of the Invention

The present application relates to an engine misfire detection device that detects a misfire of an engine.

Description of the Related Art

In recent years, as an environmental measure, detection of an engine misfire has been required for an internal combustion engine, with an object of preventing a discharge of unburned gas or protecting a catalyst provided in an exhaust system. Herein, as means of detecting an engine misfire state, means of detecting an engine rotational speed, and detecting a misfire state based on an amount of change in the rotational speed, is known as technology in the public domain, as described in, for example, Patent Document 1 or Patent Document 2.
Patent Document 1: JP-A-9-287516
Patent Document 2: JP-A-5-332193

However, a vehicle that has a differential locking function of switching between a locked state and an unlocked state is such that a device that obtains the differential locking function is configured of a gear engagement type of dog clutch, and when switching the differential locking from an unlocked state to a locked state, that is, when the gears engage, or when switching from a locked state to an unlocked state, that is, when the gears disengage, an abrupt change may occur in the engine rotational speed due to an abrupt change in a load.

Because of this, a case wherein a misfire state is erroneously detected despite there not being a misfire state occurs. Existing misfire detecting means detects a misfire based on an amount of change in the engine rotational speed, as described in, for example, Patent Document 1, but a certain constant time is needed until the detecting means detects a misfire, because of which there is a problem of delayed detection or erroneous determination when an abrupt change occurs in the engine rotational speed.

Also, there is also a method of detecting a misfire using vehicle body change amount detecting means, as described in Patent Document 2, but a dedicated sensor is needed for this method, and a determination is made by detecting a change in a vehicle body, because of which a differential locking switch is not detected directly, and there is a problem of delayed detection or erroneous determination.

SUMMARY OF THE INVENTION

The present application discloses technology for resolving the heretofore described kinds of problem, and has an object of obtaining an engine misfire detection device such that an engine misfire state can be accurately detected.

An engine misfire detection device disclosed in the present application is an engine misfire detection device of a vehicle including a differential mechanism that has a differential locking function of connecting and fixing left and right wheels and an unlocking function of disconnecting and releasing the left and right wheels, and switches between a differentially locked state and an unlocked state, wherein the engine misfire detection device is characterized by including an engine rotational speed change amount detector that detects an engine rotational speed change amount, an engine rotational speed change amount threshold setter that sets a threshold with respect to the rotational speed change amount, and a misfire detector that carries out a misfire determination on the engine when the rotational speed change amount exceeds the threshold, and carries out a misfire detection, and the misfire detector prohibits the misfire determination when a switching between the differentially locked state and the unlocked state is carried out.

According to the engine misfire detection device disclosed in the present application, an engine misfire state can be accurately detected without a change in an engine rotational speed when a differential locking is switched being erroneously determined to be a misfire.

The foregoing and other objects, features, aspects, and advantages of the present application will become more apparent from the following detailed description of the present application when taken in conjunction with the accompanying drawings.

DETAILED DESCRIPTION OF THE PREFERRED EMBODIMENTS

Hereafter, using the drawings, a preferred embodiment of an engine misfire detection device according to the present application will be described.

Figure 1:
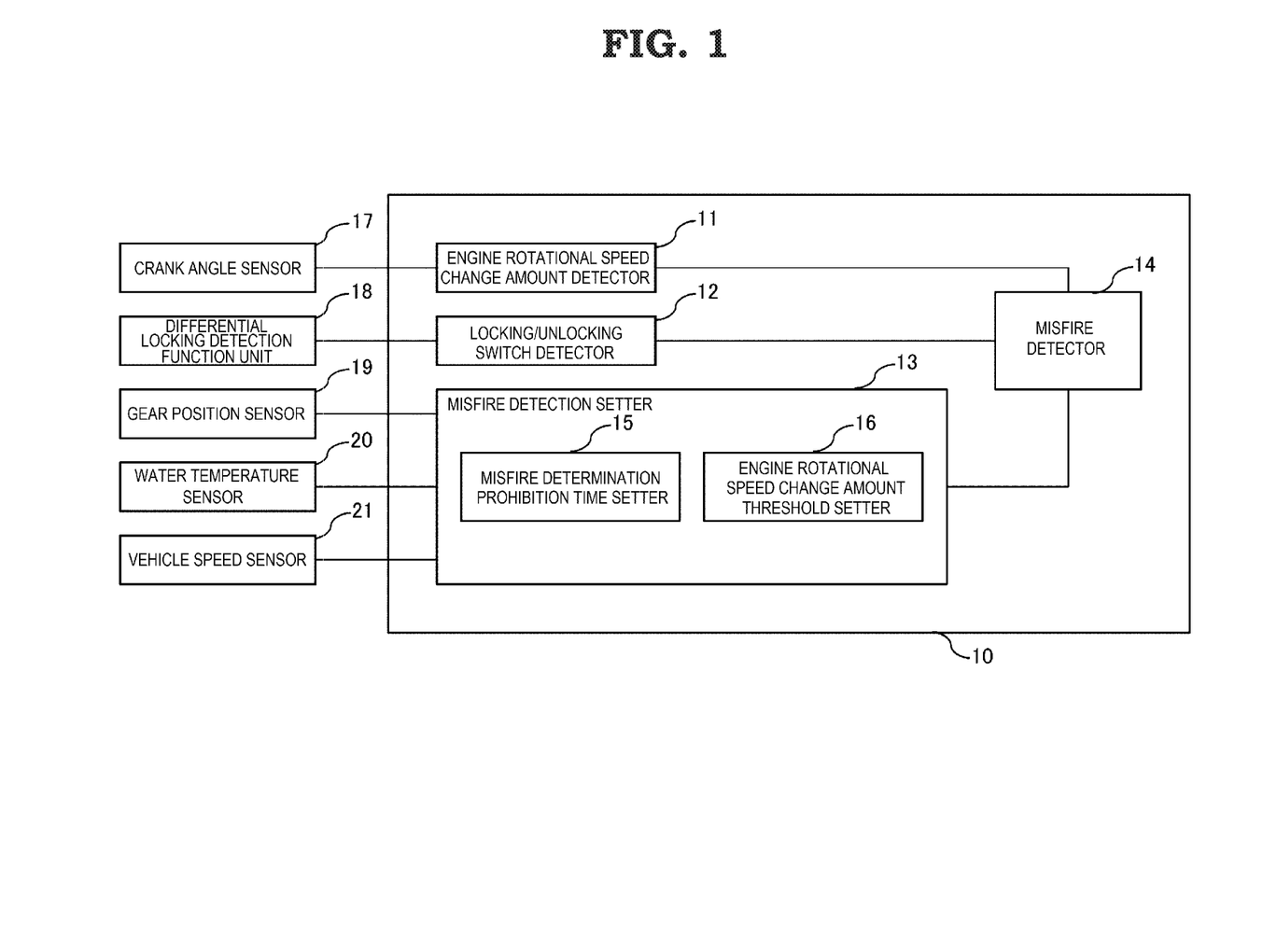
FIG. 1 is a system configuration diagram illustrating an engine misfire detection device according to a first embodiment.

FIG. 1 is a system configuration diagram illustrating an engine misfire detection device according to the first embodiment.

In FIG. 1, a misfire detection device 10 includes an engine rotational speed change amount detector 11, a locking/unlocking switch detector 12, a misfire detection setter 13, and a misfire detector 14, and is provided in an interior of an ECU (electronic control unit). Also, the misfire detection setter 13 is configured to include a misfire determination prohibition time setter 15 and an engine rotational speed change amount threshold setter 16. Further, a detection signal from a crank angle sensor 17 is input into the engine rotational speed change amount detector 11, a detection signal from a differential locking detection function unit 18 is input into the locking/unlocking switch detector 12, and detection signals from a gear position sensor 19, a water temperature sensor 20, and a vehicle speed sensor 21 are input into the misfire detection setter 13. There may be only one of the gear position sensor 19, the water temperature sensor 20, and the vehicle speed sensor 21.

Herein, the crank angle sensor 17 is attached to a crankshaft of an engine, and outputs a crank angle signal at each predetermined angle of the engine, and the differential locking detection function unit 18 switches between a locked state and an unlocked state of a differential mechanism, and detects whether a current state is a locked state or an unlocked state, or whether a switching other than this is in progress. Also, the gear position sensor 19 detects a gear position, the water temperature sensor 20 detects an engine cooling water temperature, and the vehicle speed sensor 21 detects a vehicle traveling speed, and a detection signal from each is input into the misfire detection setter 13.

Figure 2:
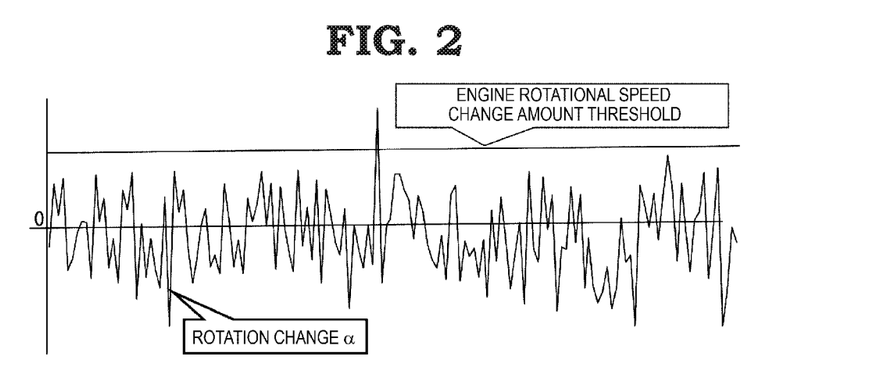
FIG. 2 is an illustration showing an example of a misfire detection determination in a misfire detector of the engine misfire detection device according to the first embodiment.

FIG. 2 is an illustration showing an example of a misfire detection determination in the misfire detector 14. The engine rotational speed change amount detector 11 receives a crank angle signal from the crank angle sensor 17 attached to the crankshaft of the engine (not shown), detects the engine rotational speed based on the received crank angle signal, and calculates an amount of change in the engine rotational speed. As a method of calculating the amount of change in the engine rotational speed (rotation change $\alpha$) is commonly known, a description thereof will be omitted.

The misfire detector 14 receives the amount of change in the engine rotational speed from the engine rotational speed change amount detector 11, determines that there is a misfire when the amount of change in the engine rotational speed is greater than an engine rotational speed change amount threshold preset in the engine rotational speed change amount threshold setter 16, determines that there is no misfire when the amount of change in the engine rotational speed is smaller than the engine rotational speed change amount threshold, and carries out a misfire detection. A procedure when calculating the engine rotational speed change amount threshold will be described hereafter.

Figure 3:
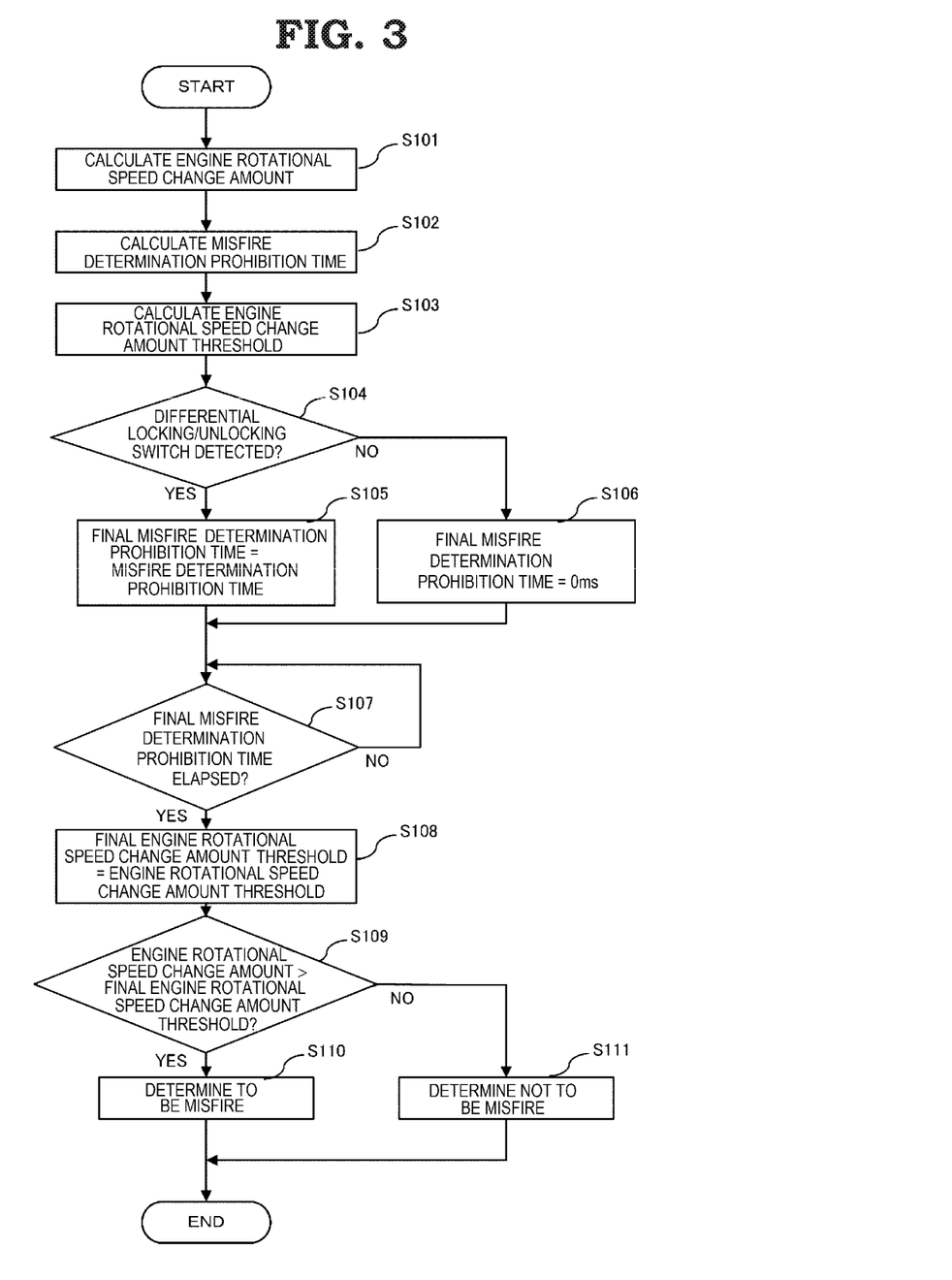
FIG. 3 is a flowchart illustrating operation steps in the engine misfire detection device according to the first embodiment.

FIG. 3 is a flowchart showing a series of operation steps in the misfire detection device 10.

Firstly, in step S101, the engine rotational speed change amount detector 11 detects the engine rotational speed based on a crank angle signal detected by the crank angle sensor 17, and calculates an amount of change in the engine rotational speed.

In step S102, the misfire determination prohibition time setter 15 of the misfire detection setter 13 calculates a misfire determination prohibition time in order to determine an existence or otherwise of a misfire determination implementation from a state of the vehicle. With regard to the misfire determination prohibition time, the misfire determination prohibition time is switched in accordance with a gear position detected by the gear position sensor 19 so as to be 3.0 ms, for example, when a current gear position is fourth gear or higher, 2.0 ms, for example, when in first to third gear, and 1.0 ms, for example, when in neutral. Setting values of conditions of the switched gear positions and the misfire determination prohibition time may be switched in accordance with a type of vehicle and a way in which the vehicle is used. Also, it is desirable that an upper limit value is decided upon and clipped so that the misfire determination prohibition time does not become too long.

Also, the misfire determination prohibition time may be switched in accordance with a state of a water temperature detected by the water temperature sensor 20 or of a vehicle speed detected by the vehicle speed sensor 21, in the same way as with the gear position detected by the gear position sensor 19. Also, the misfire determination prohibition time may be set by combining any or all of the gear position detected by the gear position sensor 19, the water temperature, and the vehicle speed. A procedure when calculating the misfire determination prohibition time will be described hereafter.

In step S103, an engine rotational speed change amount threshold for carrying out a misfire determination is calculated in the engine rotational speed change amount threshold setter 16. The threshold may be a constant value, or may be switched in accordance with a driving condition. Also, the threshold may be calculated from a map compiled based on the rotational speed of the engine or on the vehicle states, those being the gear position, the water temperature, and the vehicle speed, or may be calculated by combining these.

In step S104, the locking/unlocking switch detector 12 receives a detection signal from the differential locking detection function unit 18, and determines whether a switch from a differentially locked state to an unlocked state is in progress, or whether a switch from an unlocked state to a differentially locked state is in progress. When the locking/unlocking switch detector 12 determines that a switch from a differentially locked state to an unlocked state is in progress, or that a switch from an unlocked state to a differentially locked state is in progress, the process advances to step S105, and computation of a final misfire determination prohibition time is carried out. Also, when no differential locking switch is in progress, that is, when the locking/unlocking switch detector 12 determines that there is a differentially locked state or an unlocked state, the process advances to step S106, and 0 ms is set as the final misfire determination prohibition time.

In step S105, the misfire determination prohibition time setter 15 sets the misfire determination prohibition time calculated in step S102 in a final misfire determination prohibition timer. The final misfire determination prohibition timer is configured of a countdown timer, counts down from a set time to zero, and measures an elapse of time.

In step S107, a determination of whether the final misfire determination prohibition time has elapsed is carried out. Determination of the elapse of time is based on whether the final misfire determination prohibition timer has reached zero. When the final misfire determination prohibition timer is at zero, it is determined that the time for which misfire determination is prohibited has elapsed, the process advances to step S108, and a misfire determination is implemented.

In step S108, the engine rotational speed change amount threshold setter 16 sets the engine rotational speed change amount threshold calculated in step S103 as a final engine rotational speed change amount threshold.

In step S109, the misfire detector 14 carries out a comparison of the engine rotational speed change amount calculated in step S101 and the final engine rotational speed change amount threshold set in step S108, determines that there is a misfire when the engine rotational speed change amount is greater, and advances to step S110. When the engine rotational speed change amount is smaller, the misfire detector 14 determines that there is no misfire, and advances to step S111.

Figure 4:
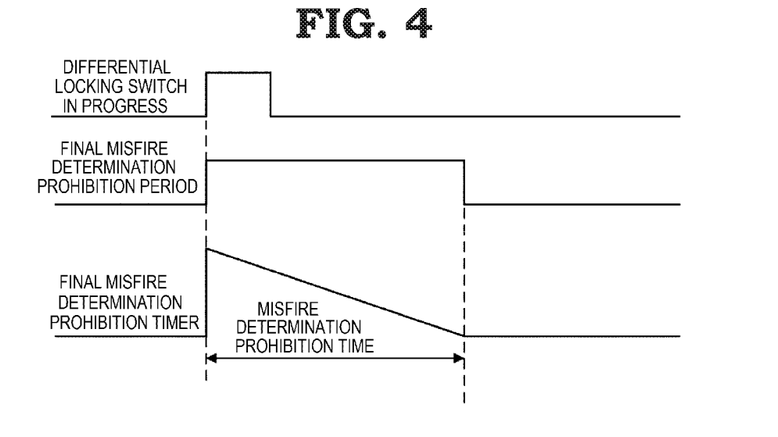
FIG. 4 is an illustration showing an example of a misfire determination prohibition time calculation in a misfire detection setter of the engine misfire detection device according to the first embodiment.

FIG. 4 is a drawing showing an operation when a misfire determination prohibition time setting is executed in the misfire determination prohibition time setter 15.

When the locking/unlocking switch detector 12 determines that a differential locking switch is in progress, a misfire determination prohibition time determined in accordance with the state at the time is set, and misfire determination is prohibited until the final misfire determination prohibition timer reaches zero.

Figure 5:
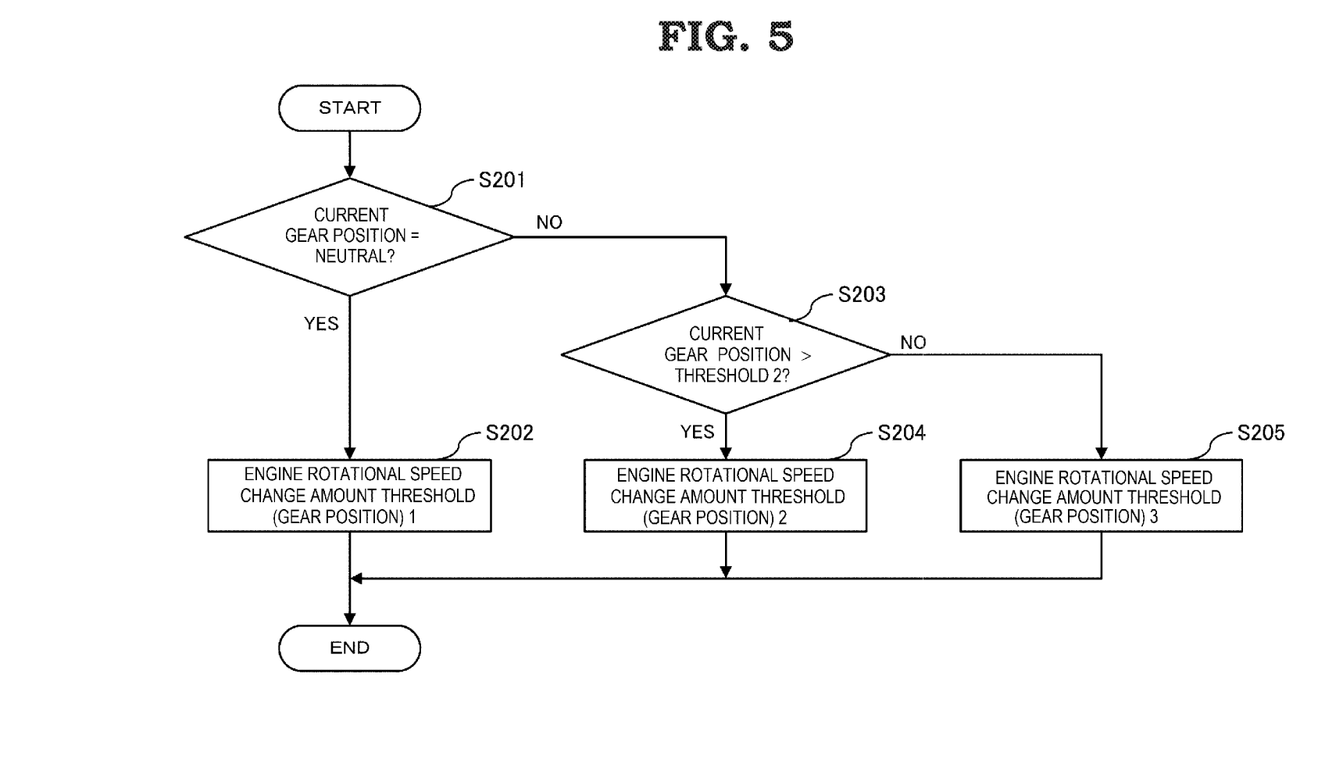
FIG. 5 is a flowchart of when an engine rotational speed change amount threshold calculation is executed in an engine rotational speed change amount threshold setter of the engine misfire detection device according to the first embodiment.

FIG. 5 is a flowchart of when an engine rotational speed change amount threshold calculation is executed in the engine rotational speed change amount threshold setter 16.

In step S201, as shown in FIG. 5, the engine rotational speed change amount threshold setter 16 determines whether or not the current gear position is neutral, advances to step S202 when the current gear position is neutral, sets the engine rotational speed change amount threshold (the gear position) to first, and ends the process.

When it is determined in step S201 that the current gear position is not neutral, the engine rotational speed change amount threshold setter 16 advances to step S203, determines whether or not the current gear position is greater than a second threshold, advances to step S204 when the current gear position is greater than the second threshold, sets the engine rotational speed change amount threshold (the gear position) to second, and ends the process. When it is determined in step S203 that the current gear position is smaller than the second threshold, the engine rotational speed change amount threshold setter 16 advances to step S205, sets the engine rotational speed change amount threshold (the gear position) to third, and ends the process.

As heretofore described, the current gear position and a threshold are compared in the engine rotational speed change amount threshold setter 16, and an engine rotational speed change amount threshold determined in accordance with the gear position is determined.

Figure 6:
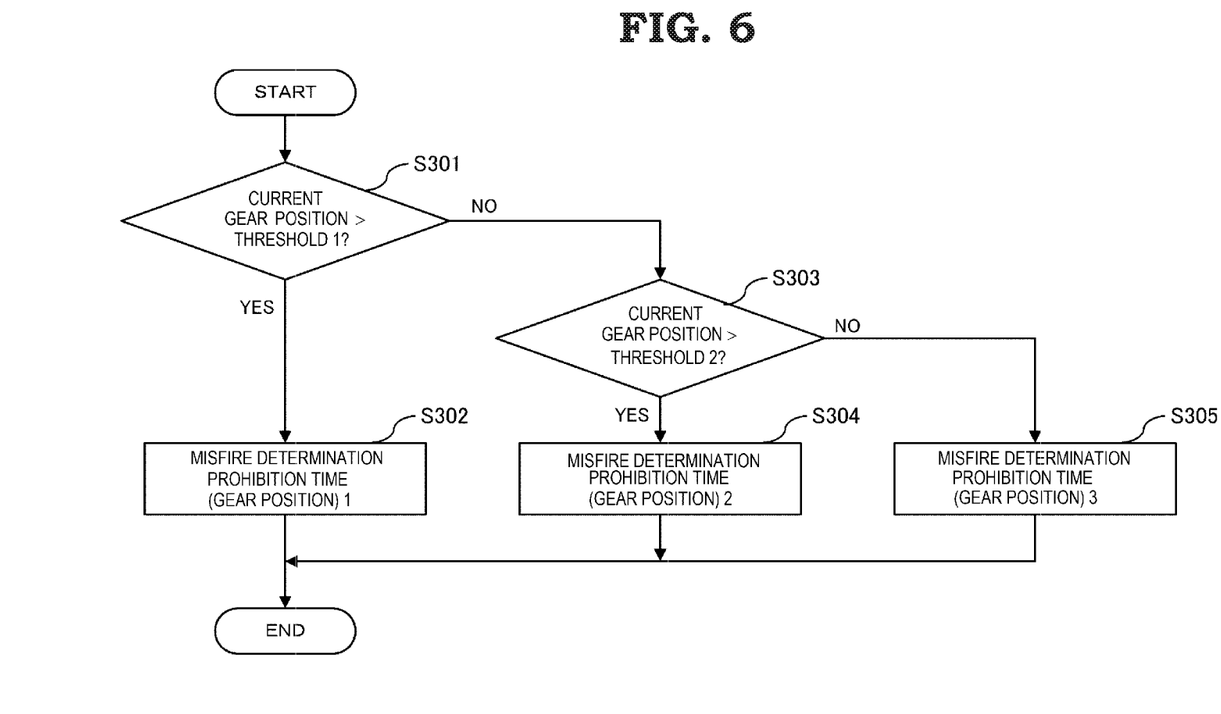
FIG. 6 is a flowchart of when a misfire determination prohibition time calculation is executed in a misfire determination prohibition time setter of the engine misfire detection device according to the first embodiment.

FIG. 6 is a flowchart of when a misfire determination prohibition time calculation is executed in the misfire determination prohibition time setter 15.

In step S301, as shown in FIG. 6, the misfire determination prohibition time setter 15 determines whether or not the current gear position is greater than a first threshold, advances to step S302 when the current gear position is determined to be greater than the first threshold, sets the misfire determination prohibition time (the gear position) to first, and ends the process.

When it is determined in step S301 that the current gear position is smaller than the first threshold, the misfire determination prohibition time setter 15 advances to step S303, determines whether or not the current gear position is greater than a second threshold, advances to step S304 when the current gear position is greater than the second threshold, sets the misfire determination prohibition time (the gear position) to second, and ends the process. When it is determined in step S303 that the current gear position is smaller than the second threshold, the misfire determination prohibition time setter 15 advances to step S305, sets the misfire determination prohibition time (the gear position) to third, and ends the process.

As heretofore described, the misfire determination prohibition time setter 15 compares the current gear position and a threshold, and determines a misfire determination prohibition time determined in accordance with the gear position.

Figure 7:
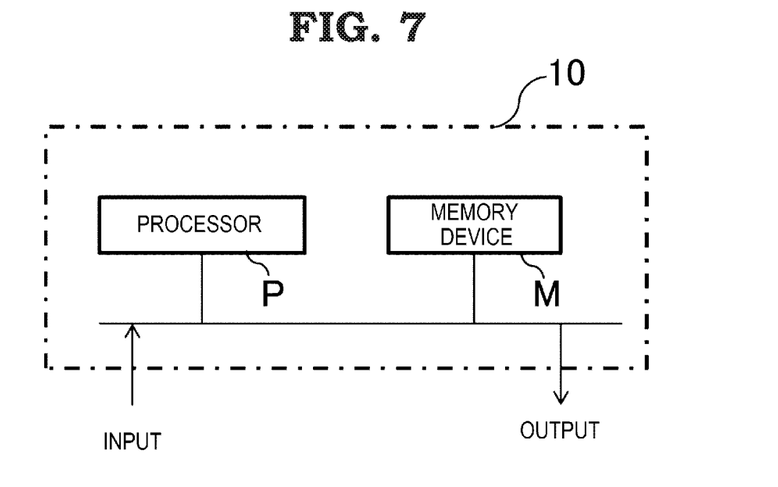
FIG. 7 is a drawing showing an example of hardware of the engine misfire detection device according to the first embodiment.

The misfire detection device 10 is configured of a processor P and a memory device M, as shown in a hardware example in FIG. 7. Although not shown in the drawing, the memory device M includes a volatile memory device such as a random access memory and a non-volatile auxiliary memory device such as a flash memory. Also, the memory device M may include a hard disk auxiliary memory device instead of a flash memory. The processor P executes a program input from the memory device M. In this case, the program is input into the processor P from the auxiliary memory device via the volatile memory device. Also, the processor P may output data such as a computation result to the volatile memory device of the memory device M, or may save data in the auxiliary memory device via the volatile memory device.

According to the engine misfire detection device according to the first embodiment, as heretofore described, an engine misfire state can be accurately detected without a change in the engine rotational speed when a differential locking is switched being erroneously determined to be a misfire. Also, an optimum misfire determination prohibition time can be set in accordance with a driving state, and an erroneous misfire detection can be prevented.

Although the present application is described above in terms of an exemplary embodiment, it should be understood that the various features, aspects, and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present application. For example, at least one of the constituent components may be modified, added, or eliminated.

What is claimed is:

1. An engine misfire detection device of a vehicle including a differential mechanism that has a differential locking function of connecting and fixing left and right wheels and an unlocking function of disconnecting and releasing the left and right wheels, and switches between a differentially locked state and an unlocked state, the engine misfire detection device comprising:
an engine rotational speed change amount detector that detects an engine rotational speed change amount;
an engine rotational speed change amount threshold setter that sets a threshold with respect to the rotational speed change amount; and
a misfire detector that carries out a misfire determination on the engine when the rotational speed change amount exceeds the threshold, and carries out a misfire detection, wherein
when a switching between the differentially locked state and the unlocked state is carried out, the misfire detector prohibits the misfire determination during a predetermined prohibition time of the misfire determination that is set differently according to a gear position of the vehicle.

2. The engine misfire detection device according to claim 1, wherein the prohibition time of the misfire determination is set to be longer than a time for carrying out the switching between the differentially locked state and the unlocked state.

3. The engine misfire detection device according to claim 2, wherein the threshold is switched in accordance with at least one state of a current engine rotational speed, a current cooling water temperature of the engine, and a current vehicle speed.

4. The engine misfire detection device according to claim 1, wherein the prohibition time of the misfire determination is set based on the gear position and a water temperature of the vehicle.

5. The engine misfire detection device according to claim 4, wherein the threshold is switched in accordance with at least one state of a current engine rotational speed, a current cooling water temperature of the engine, and a current vehicle speed.

6. The engine misfire detection device according to claim 1, wherein the prohibition time of the misfire determination is set based on the gear position and a speed of the vehicle.

7. The engine misfire detection device according to claim 1, wherein the threshold is switched in accordance with at least one state of a current engine rotational speed, a current cooling water temperature of the engine, and a current vehicle speed.

* * * * *